United States Patent
Fujii et al.

[11] Patent Number: 6,048,633
[45] Date of Patent: Apr. 11, 2000

[54] FUEL CELL STACK

[75] Inventors: Yosuke Fujii; Takafumi Okamoto; Manabu Tanaka; Akio Yamamoto; Hidemitsu Ono; Narutoshi Sugita, all of Wako, Japan

[73] Assignee: Honda Giken Kogyo Kabushiki Kaisha, Tokyo, Japan

[21] Appl. No.: 09/188,949

[22] Filed: Nov. 10, 1998

[30] Foreign Application Priority Data

Mar. 2, 1998 [JP] Japan ................... 10-049304

[51] Int. Cl.⁷ .................................. H01M 8/10
[52] U.S. Cl. ............... 429/32; 429/38; 429/39; 429/14; 429/17
[58] Field of Search ................. 429/32, 38, 39, 429/14, 17

[56] References Cited

U.S. PATENT DOCUMENTS 5,300,370  4/1994  Washington et al. ........... 429/39

FOREIGN PATENT DOCUMENTS 06267564  9/1994  Japan .

*Primary Examiner*—Bruce F. Bell
*Attorney, Agent, or Firm*—Lyon & Lyon LLP

[57] ABSTRACT

A fuel cell stack comprises first and second separators for holding a fuel cell unit therebetween. The first separator has a fuel gas flow passage and the second separator has an oxygen-containing gas flow passage. The gas flow passages are formed by grooves with the number of grooves decreasing from the inlet to the outlet. In one embodiment, the gas flow passage comprises twelve individual first gas flow passage grooves which communicate with an inlet hole on a gas inlet side, six individual second gas flow passage grooves which communicate with the first gas flow passage grooves, and three individual third gas flow passage grooves which communicate with the second gas flow passage grooves. The third gas flow passage grooves communicate with an outlet hole on a gas outlet side.

17 Claims, 6 Drawing Sheets ns cell stack comprising a fuel cell unit including a solid polymer electrolyte interposed between an anode electrode and a cathode electrode, and first and second separators for holding the fuel cell unit therebetween.

2. Description of the Related Art

For example, a fuel cell of the solid polymer electrolyte type includes an anode electrode and a cathode electrode disposed opposingly on both sides of an electrolyte membrane composed of a polymer electrolyte (cation exchange membrane) to construct a fuel cell structure (hereinafter referred to as "fuel cell unit") which is held between separators. In general, a predetermined number of the fuel cell units are stacked to provide a fuel cell stack which is practically used.

Such a fuel cell is operated as follows. That is, a fuel gas, for example, hydrogen, which is supplied to the anode electrode, is converted into hydrogen ion on electrode catalysts. The hydrogen ion is moved toward the cathode electrode via the polymer electrolyte which is appropriately humidified. Electrons are generated during this process, which are extracted by an external circuit to be utilized as direct current electric energy. An oxygen-containing gas, for example, oxygen gas or air is supplied to the cathode electrode. Therefore, the hydrogen ion, the electrons, and the oxygen are reacted with each other on the cathode electrode to produce water.

In order to supply the fuel gas and the oxygen-containing gas to the anode electrode and the cathode electrode respectively, conductive porous layers such as porous carbon paper sheets are disposed on electrode catalyst layers (electrode surfaces), and they are interposed between the separators. One or a plurality of gas flow passages, each of which is designed to have a uniform widthwise dimension, are disposed on mutually opposing surfaces of the respective separators.

However, in the case of the fuel cell constructed as described above, the number of reactive molecules per unit area existing in the vicinity of an outlet of the gas flow passage decreases as compared with the number of reactive molecules per unit area existing at an inlet of the gas flow passage, because the fuel gas and the oxygen-containing gas supplied to the gas flow passage are consumed in the electrode surface. Accordingly, a problem occurs in that the reaction in the electrode surface becomes non-uniform, and the cell performance becomes unstable.

An amount of condensed water and an amount of water produced by the reaction sometimes exist in the gas flow passage in a state of liquid (water). It is feared that if the water is accumulated in the porous electrode layer, then the performance to diffuse the fuel gas and the oxygen-containing gas to the catalyst electrode layer is lowered, and the cell performance is markedly deteriorated.

In this context, for example, a fuel cell is known, as disclosed in Japanese Laid-Open Patent Publication No. 6-267564. The fuel cell includes a fuel-delivering plate having a fuel flow passage for supplying fuel to an anode electrode, and an oxygen-containing gas-delivering plate having an oxygen-containing gas flow passage for supplying an oxygen-containing gas to a cathode electrode, in which at least any one of the depth or the width of the oxygen-containing gas flow passage of the oxygen-containing gas-delivering plate gradually decreases from an upstream flow passage region to a downstream flow passage region.

However, in order to sufficiently supply the fuel gas and the oxygen-containing gas to the electrode surfaces respectively, the gas flow passage is provided in a serpentine manner or in an encircling manner in a surface of the separator. Therefore, the gas flow passage is considerably lengthy in the separator surface. In the case of the conventional fuel cell as described above, the depth of the oxygen-containing gas flow passage is large in the upstream flow passage region, and hence the separator itself is considerably thick-walled. Accordingly, a problem is pointed out that it is not easy for the entire fuel cell to achieve a compact size. Further, a problem arises in that the machining operation for manufacturing the gas flow passage to have the depth which gradually decreases from the upstream to the downstream is extremely complicated.

SUMMARY OF THE INVENTION

A principal object of the present invention is to provide a fuel cell stack which makes it possible to ensure good gas diffusion performance and good drainage performance, and effectively miniaturize the size of the fuel cell stack.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
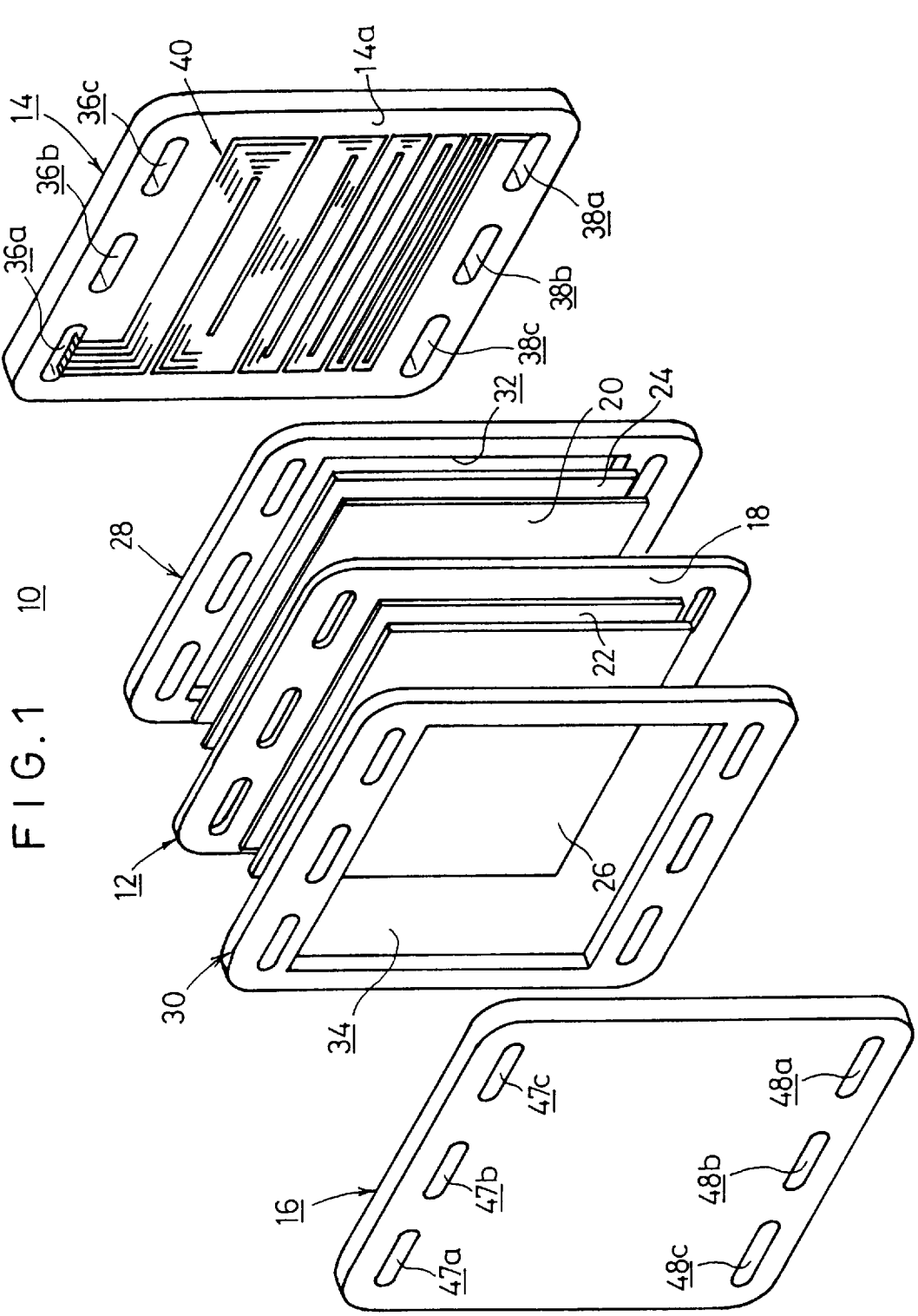
FIG. 1 shows an exploded perspective view of principal parts of a fuel cell stack according to a first embodiment of the present invention.
Figure 2:
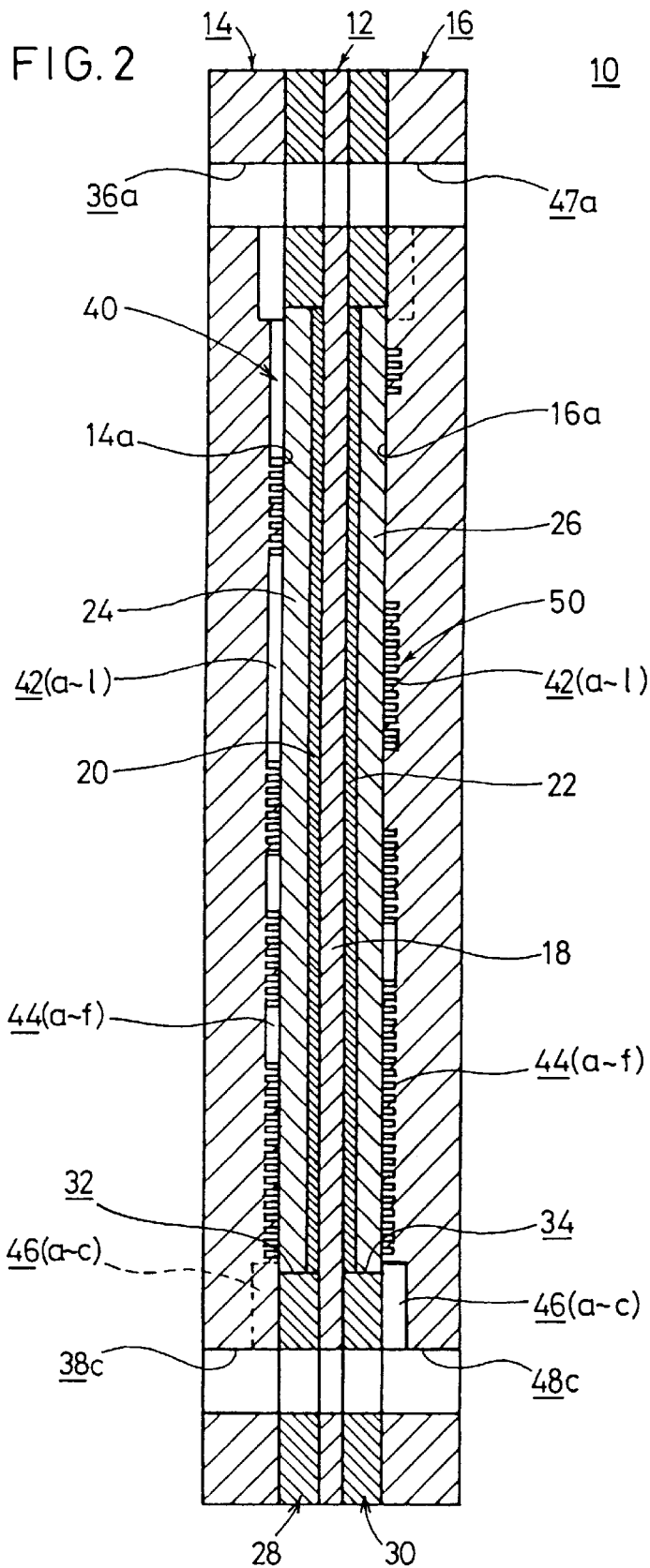
FIG. 2 shows a schematic longitudinal sectional view of the fuel cell stack.

FIG. 1 shows an exploded perspective view of principal parts of a fuel cell stack 10 according to a first embodiment of the present invention, and FIG. 2 shows a schematic longitudinal sectional view of the fuel cell stack 10.

The fuel cell stack 10 comprises a fuel cell unit 12, and first and second separators 14, 16 for holding the fuel cell unit 12 therebetween. A plurality of sets of the foregoing components are optionally stacked. The fuel cell unit 12 includes a solid polymer electrolyte 18, and an anode electrode 20 and a cathode electrode 22 arranged with the electrolyte 18 interposed therebetween. First and second gas diffusion layers 24, 26, each of which is composed of, for example, a porous carbon paper sheet as a porous layer, are disposed on the anode electrode 20 and the cathode electrode 22 respectively.

First and second gaskets 28, 30 are disposed on both sides of the fuel cell unit 12. The first gasket 28 has a large opening 32 for accommodating the anode electrode 20 and the first gas diffusion layer 24, while the second gasket 30 has a large opening 34 for accommodating the cathode electrode 22 and the second gas diffusion layer 26. The fuel cell unit 12 and the first and second gaskets 28, 30 are interposed between the first and second separators 14, 16.

Figure 3:
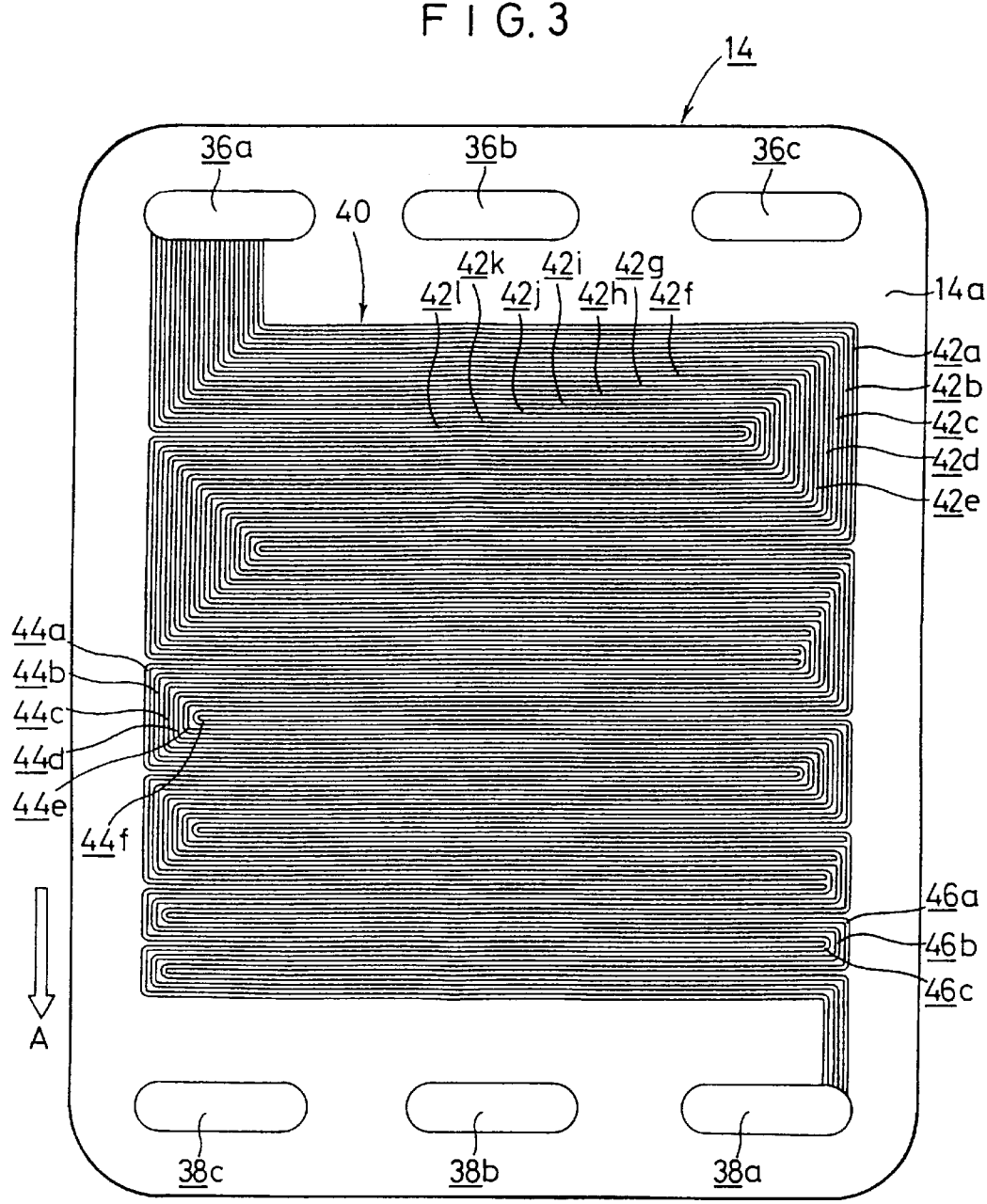
FIG. 3 shows a front view of a first separator included in the fuel cell stack.

As shown in FIGS. 1 and 3, the first separator 14 is provided at its upper portion with an inlet hole 36a for allowing a fuel gas such as hydrogen to pass therethrough, an inlet hole 36b for allowing cooling water to pass therethrough, and an inlet hole 36c for allowing an oxygen-containing gas such as oxygen or air to pass therethrough. The first separator 14 is provided at its lower portion with an outlet hole 38a for allowing the fuel gas to pass therethrough, an outlet hole 38b for allowing the cooling water to pass therethrough, and an outlet hole 38c for allowing the oxygen-containing gas to pass therethrough.

A fuel gas flow passage (first gas flow passage) 40 for making communication between the holes 36a, 38a is formed in a surface 14a which opposes the anode electrode 20 of the first separator 14. The number of grooves used for the fuel gas flow passage 40 on the side of the inlet hole 36a for introducing the gas is set to be larger than the number of grooves on the side of the outlet hole 38a for discharging the gas. The grooves on the side of the inlet hole 36a are gradually merged with each other as the grooves come to the side of the outlet hole 38a. The decreasing rate of the number of grooves of the fuel gas flow passage 40 is set to correspond to the gas utilization factor of the fuel gas (the gas utilization factor being herein referred to as a utilization factor of hydrogen gas with respect to the entire gas such as a reformed gas).

Specifically, in the case of a pure fuel gas containing 100% hydrogen gas, the decreasing rate of the number of grooves of the fuel gas flow passage 40 is represented by (number of grooves on outlet side)/(number of grooves on inlet side)=(gas utilization factor (%))/100. On the other hand, in the case of a reformed gas containing, for example, $CO_2$ gas and $N_2$ gas in addition to hydrogen gas, the decreasing rate is represented by (number of grooves on outlet side)/(number of grooves on inlet side)=[{(fuel gas in reformed gas (%)) ×(100−utilization factor (%))}/100+ {100−(fuel gas in reformed gas (%))}]/100=(mass flow on outlet side)/(mass flow on inlet side).

Illustrative compositions of the reformed gas are shown, for example, in Table 1.

TABLE 1

Illustrative composition of reformed gas

|  |  | $H_2$ | $CO_2$ | $N_2$ |
|---|---|---|---|---|
| (1) | Stationary state (1) | 60% | 23% | 17% |
| (2) | Acceleration | 43.40% | 21% | 35.60% |
| (3) | Stationary state (2) | 75% | 25% | — |

In the comparative compositions (1) to (3), there are relationships as shown in Tables 2, 3, and 4 between the hydrogen gas utilization factor and the gas utilization factor which is a hydrogen gas utilization factor estimated for the entire gas.

TABLE 2

Relationship between utilization factor of $H_2$ and utilization factor of entire gas (in the case of (1))

| $H_2$ utilization factor (%) | Gas utilization factor ($H_2$/entire gas) (%) |
|---|---|
| 70 | 42 |
| 75 | 45 |
| 80 | 48 |
| 85 | 51 |
| 90 | 54 |

TABLE 3

Relationship between utilization factor of $H_2$ and utilization factor of entire gas (in the case of (2))

| $H_2$ utilization factor (%) | Gas utilization factor ($H_2$/entire gas) (%) |
|---|---|
| 70 | 30 |
| 75 | 32 |
| 80 | 35 |
| 85 | 37 |
| 90 | 39 |

TABLE 4

Relationship between utilization factor of $H_2$ and utilization factor of entire gas (in the case of (3))

| $H_2$ utilization factor (%) | Gas utilization factor ($H_2$/entire gas) (%) |
|---|---|
| 70 | 52 |
| 75 | 56 |
| 80 | 60 |
| 85 | 64 |
| 90 | 67 |

The relationship between the arrangement of the decrease in the number of grooves and the decreasing rate is shown in Table 5.

TABLE 5

Decreasing rate of number of grooves

|  | Number of grooves on inlet side | Decrease in number of grooves | Decreasing rate corresponding to gas utilization factor |
|---|---|---|---|
| (A) | 16 | 16 → 8 | 50% |
| (B) | 16 | 16 → 8 → 4 | 75% |
| (C) | 14 | 14 → 7 | 50% |
| (D) | 14 | 14 → 7 → 4 | 71% |
| (E) | 12 | 12 → 6 | 50% |
| (F) | 12 | 12 → 6 → 3 | 75% |
| (G) | 12 | 12 → 6 → 3 → 2 → 1 | 92% |
| (H) | 10 | 10 → 5 | 50% |
| (I) | 10 | 10 → 5 → 3 | 70% |

In the case of the "Stationary state (1)" concerning the illustrative composition (1) shown in Table 1, the gas utilization factor is about 50% as shown in Table 2. Those used for the decreasing rate of the number of grooves include the arrangements of (A), (C), (E), and (H) shown in Table 5. In the case of the "Acceleration" concerning the illustrative composition (2) shown in Table 1, the gas utilization factor is about 30 to 40% as shown in Table 3. However, the shape of grooves of the fuel gas flow passage 40 is set based on the gas utilization factor of not less than 50%. Therefore, those used for the decreasing rate of the number of grooves include the arrangements of (A), (C), (E), and (H) shown in Table 5, in the same manner as the illustrative composition (1).

In the case of the "Stationary state (2)" concerning the illustrative composition (3) shown in Table 1, the gas utilization factor is about 50 to 70% as shown in Table 4. Therefore, when the gas utilization factor is set to be 50%, the arrangements of (A), (C), (E), and (H) shown in Table 5 are used. When the gas utilization factor is set to be not less than 70%, the arrangements of (B), (D), (F), (G), and (I) shown in Table 5 are used.

In the first embodiment, the arrangement of (F) shown in Table 5 is used. As shown in FIG. 3, twelve individual first gas flow passage grooves 42a to 42l are formed on the surface 14a of the first separator 14, corresponding to those disposed on the side of the inlet hole 36a for introducing the gas. The first gas flow passage grooves 42a to 42l are formed in the surface of the surface 14a of the first separator 14 in a serpentine configuration vertically extending downwardly (in a direction indicated by an arrow A) while being separated from each other by a predetermined spacing distance.

The number of the first gas flow passage grooves 42a to 42l is decreased to a half at an approximately intermediate position of the height of the separator 14 to form six individual second gas flow passage grooves 44a to 44f. The second gas flow passage grooves 44a to 44f are serpentine in the direction indicated by the arrow A, and the number of them is decreased to a half at their terminals to form three individual third gas flow passage grooves 46a to 46c. The third gas flow passage grooves 46a to 46c are serpentine in the direction indicated by the arrow A, and then they communicate with the outlet hole 38a for discharging the gas. The first gas flow passage grooves 42a to 42l are continuously merged to the third gas flow passage grooves 46a to 46c. The first gas flow passage grooves 42a to 42l communicate with the inlet hole 36a for introducing the gas, while the third gas flow passage grooves 46a to 46c communicate with the outlet hole 38a for discharging the gas.

As shown in FIG. 1, the second separator 16 is provided at its upper portion with a fuel gas inlet hole 47a, a cooling water inlet hole 47b, and an oxygen-containing gas inlet hole 47c. The second separator 16 is provided at its lower portion with a fuel gas outlet hole 48a, a cooling water outlet hole 48b, and an oxygen-containing gas outlet hole 48c.

As shown in FIG. 2, an oxygen-containing gas flow passage (second gas flow passage) 50 for making communication between the holes 47a, 48c is formed on a surface 16a opposing the cathode electrode 22 of the second separator 16. The oxygen-containing gas flow passage 50 is set to satisfy (number of grooves on outlet side)/(number of grooves on inlet side)=[{(oxygen gas in air (%))×(100−gas utilization factor (%))}/100+{100−(oxygen gas in air (%))}]/100=(amount of gas on outlet side)/(amount of gas on inlet side).

The oxygen-containing gas flow passage 50 is constructed in the same manner as the fuel gas flow passage 40. Therefore, the same constitutive components are designated by the same reference numerals, and a detailed explanation of which will be omitted.

The operation of the fuel cell stack 10 according to the first embodiment constructed as described above will be described below.

The reformed gas as the fuel gas is supplied to the fuel cell stack 10, and the air as the oxygen-containing gas is supplied thereto. The reformed gas is introduced via the inlet hole 36a of the first separator 14 into the fuel gas flow passage 40. As shown in FIG. 3, the reformed gas, which has been supplied to the fuel gas flow passage 40, is initially introduced into the first gas flow passage grooves 42a to 42l. The gas is moved downwardly in accordance with gravity (in the direction indicated by the arrow A) while following serpentine configuration along the surface 14a of the first separator 14. During this process, the hydrogen gas contained in the reformed gas passes through the first gas diffusion layer 24, and it is supplied to the anode electrode 20 of the fuel cell unit 12.

The residual reformed gas is introduced into the second gas flow passage grooves 44a to 44f connected to the terminals of the first gas flow passage grooves 42a to 42l The gas is moved in the direction of gravity while following serpentine configuration along the surface 14a to effect diffusion of the hydrogen gas. The reformed gas is thereafter introduced into the third gas flow passage grooves 46a to 46c connected to the terminals of the second gas flow passage grooves 44a to 44f. The gas undergoes diffusion of the hydrogen gas while being moved in the direction of gravity. After that, the gas is discharged from the outlet hole 38a of the first separator 14.

In the first embodiment, the number of grooves of the fuel gas flow passage 40 is decreased half by half in a stepwise manner from the inlet hole 36a for introducing the gas to the outlet hole 38a for discharging the gas. That is, the fuel gas flow passage 40 is provided with twelve of the first gas flow passage grooves 42a to 42l, six of the second gas flow passage grooves 44a to 44f, and three of the third gas flow passage grooves 46a to 46c. The decreasing rate of the number of grooves is set to be 75% corresponding to the gas utilization factor of the reformed gas.

Therefore, when the reformed gas is consumed by allowing the hydrogen gas to pass through the first gas diffusion layer 24 from the surface 14a of the first separator 14 so that the hydrogen gas is supplied to the anode electrode 20, the number of reactive molecules per unit area is not consequently decreased, because the number of grooves of the fuel gas flow passage 40 is decreased. Accordingly, an effect is obtained in that the uniform and smooth reaction is effectively performed over the entire electrode surface of the anode electrode 20.

Further, the gas flow rate can be improved at the outlet hole 38a for discharging the gas, because the fuel gas flow passage 40 is designed to decrease the number of grooves from the inlet hole 36a to the outlet hole 38a. Therefore, it is possible to increase the gas flow rate along the surface 14a of the first separator 14. Accordingly, an effect is obtained in that the gas diffusion performance is significantly improved by causing disturbance of the gas flow, and it is possible to improve the drainage performance. Therefore, the present invention is advantageous in that it is possible to certainly achieve an improvement in cell performance of the fuel cell stack 10.

The fuel gas flow passage 40 is not changed in the depth direction in the first separator 14. The first separator 14 itself can be effectively thin-walled in its thickness. Accordingly, the entire fuel cell stack 10 can be easily miniaturized (thin-walled), and it is possible to simplify the machining operation.

On the other hand, the air is supplied from the inlet hole 47c to the oxygen-containing gas flow passage 50 of the second separator 16. The air is supplied from the inlet hole 47c for introducing the gas to the outlet hole 48c for discharging the gas, in the same manner as the reformed gas is supplied to the fuel gas flow passage 40. During this process, the number of grooves of the oxygen-containing gas flow passage 50 is set to decrease half by half in a stepwise manner. The oxygen gas is supplied from the second gas diffusion layer 26 to the cathode electrode 22, while the number of reactive molecules per unit area is not decreased. Further, it is possible to increase the gas flow rate. Accordingly, a beneficial effect is obtained in that the cell performance is improved.

Figure 4:
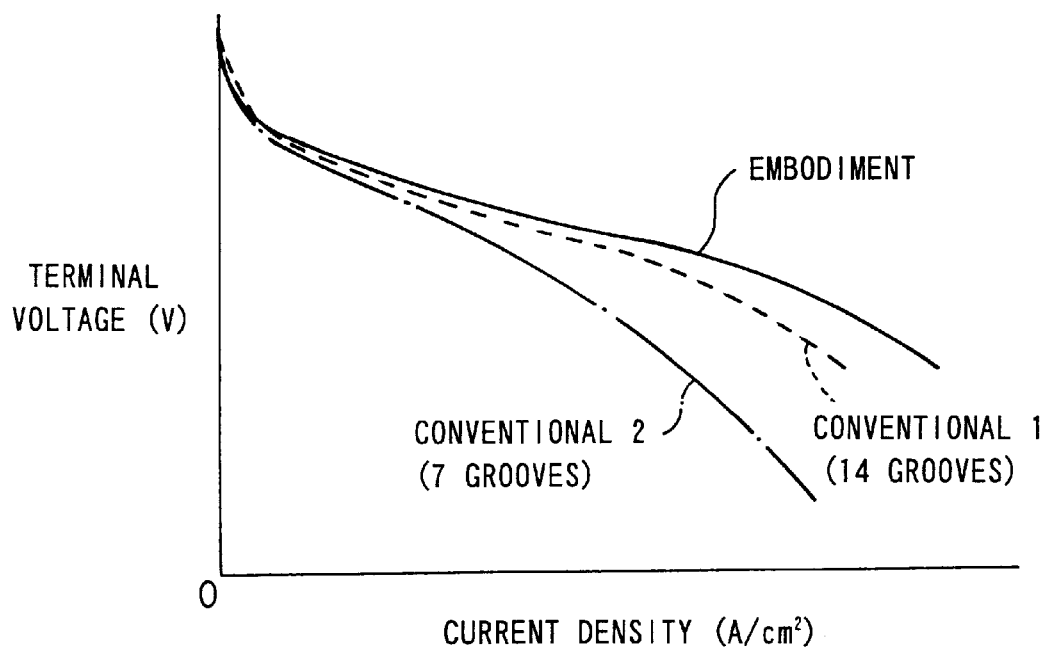
FIG. 4 shows characteristic curves concerning the voltage and the current density, obtained for the fuel cell stack of the present invention and conventional fuel cell stacks.

FIG. 4 shows results of detection of characteristics of the current density and the voltage concerning the fuel cell stack 10 according to the first embodiment and two conventional fuel cells. The gas utilization factor of the reformed gas is 75%, and the gas utilization factor of the oxygen-containing gas is 50%. The reformed gas is humidified, while the oxygen-containing gas is not humidified. The applied pressure to the gas is set to be 100 Kpa for both the reformed gas and the oxygen-containing gas. Accordingly, the desired result is obtained in that the current density is high, and the cell performance is greatly improved in the fuel cell stack 10 according to the first embodiment as compared with the conventional fuel cells 1 and 2.

In the first embodiment, both the fuel gas flow passage 40 and the oxygen-containing gas flow passage 50 are subjected to the decrease in the number of grooves from the gas inlet side to the gas outlet side. However, it is allowable that only one of the fuel gas flow passage 40 and the oxygen-containing gas flow passage 50 may be constructed as described above.

The first and second separators 14, 16 are constructed such that the gas inlets are disposed at the upper portion, and the gas outlets are disposed at the lower portion so that the fuel gas and the oxygen-containing gas are allowed to flow from the upper portion to the lower portion. Alternatively, it is also allowable to use first and second separators constructed such that the gas inlets are disposed at the lower portion, and the gas outlets are disposed at the upper portion so that the fuel gas and the oxygen-containing gas are allowed to flow from the lower portion to the upper portion. In this arrangement, the fuel gas flow passage and/or the oxygen-containing gas flow passage undergoes the decrease in the number of grooves from the gas inlet side to the gas outlet side, i.e., from the lower portion to the upper portion. Thus, it is possible to obtain the same effect as that obtained in the first embodiment.

Figure 5:
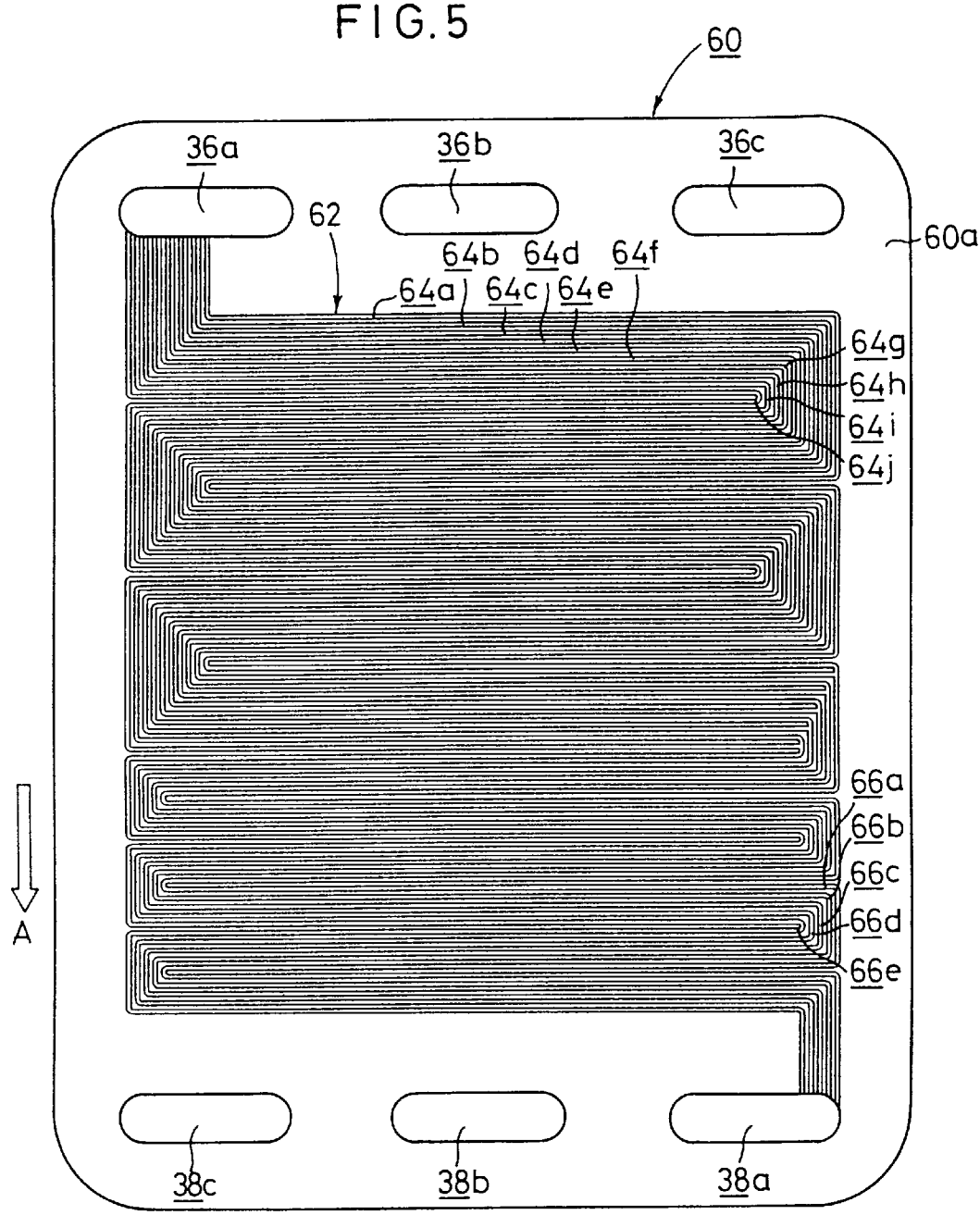
FIG. 5 shows a front view of a first separator included in a fuel cell stack according to a second embodiment of the present invention.
Figure 6:
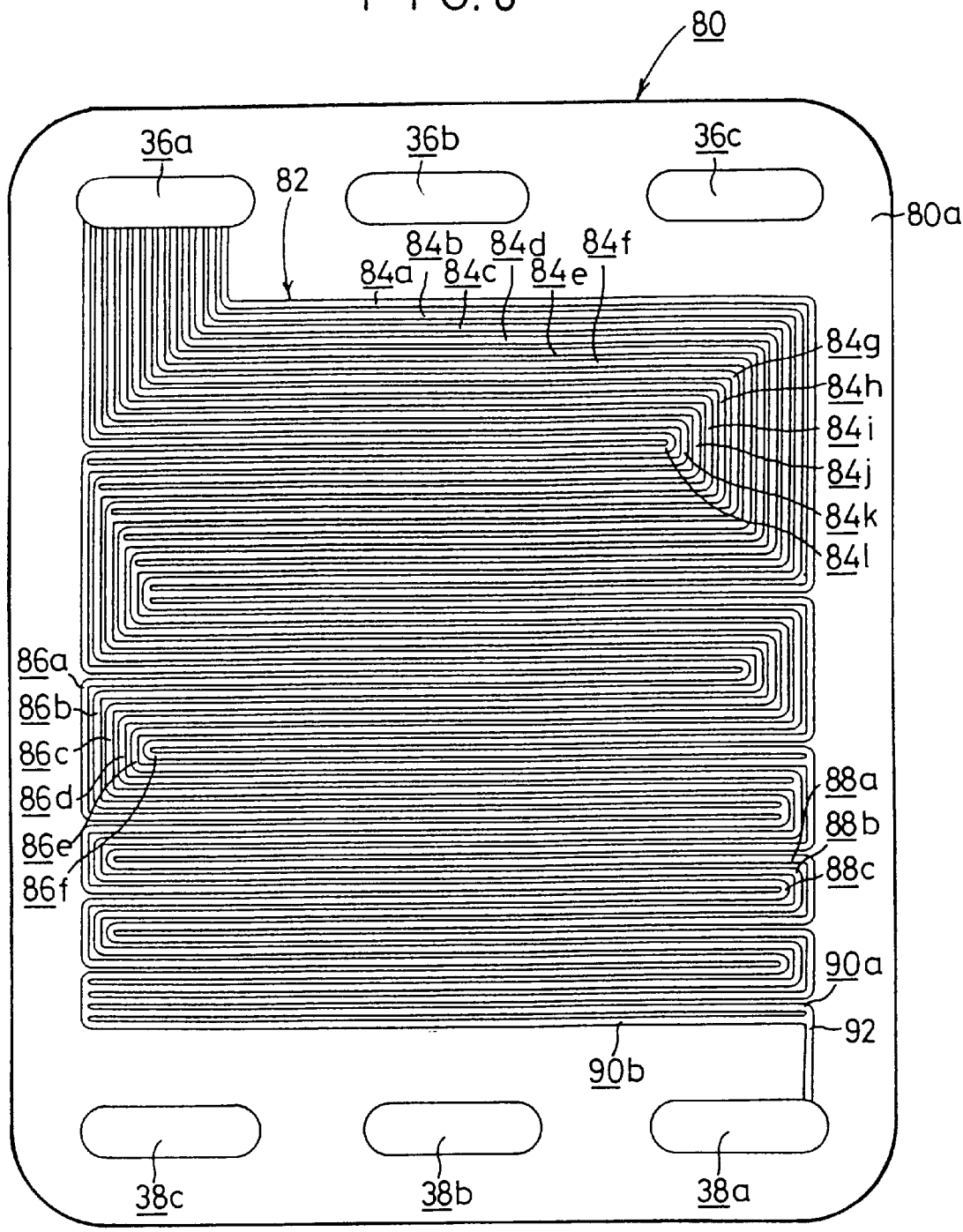
FIG. 6 shows a front view of a first separator included in a fuel cell stack according to a third embodiment of the present invention.

FIG. 5 shows a front view of a first separator 60 included in a fuel cell stack according to a second embodiment of the present invention, and FIG. 6 shows a front view of a first separator 80 included in a fuel cell stack according to a third embodiment of the present invention. The same constitutive components as those of the first separator 14 included in the fuel cell stack 10 according to the first embodiment are designated by the same reference numerals, and a detailed explanation of which will be omitted.

As shown in FIG. 5, the first separator 60 according to the second embodiment has its surface 60a provided with a fuel gas flow passage 62. The fuel gas flow passage 62 corresponds to the gas utilization factor of 50% shown in (H) in Table 5. Specifically, ten individual gas flow passage grooves 61a to 64j communicate with an inlet hole 36a for introducing the gas. The first gas flow passage grooves 64a to 64j extend in a serpentine configuration in the direction of gravity, and they communicate with five individual second gas flow passage grooves 66a to 66e at their terminals. The second gas flow passage grooves 66a to 66e extend along the surface 60a while extending in a serpentine configuration in the direction of gravity, and they communicate with an outlet hole 38a for discharging the gas.

A fuel gas flow passage 82 is provided in a surface 80a of a first separator 80 according to the third embodiment shown in FIG. 6. The fuel gas flow passage 82 corresponds to the gas utilization factor of 92% shown in (G) in Table 5. That is, the fuel gas flow passage 82 comprises twelve individual first gas flow passage grooves 84a to 84l which communicate with an inlet hole 36a, six individual second gas flow passage grooves 86a to 86f which are connected to the terminals of the first gas flow passage grooves 84a to 84l, three individual third gas flow passage grooves 88a to 88c which communicate with the terminals of the second gas flow passage grooves 86a to 86f, two individual fourth gas flow passage grooves 90a, 90b which communicate with the terminals of the third gas flow passage grooves 88a to 88c, and a fifth gas flow passage groove 92 which communicates with the terminals of the fourth gas flow passage grooves 90a, 90b. The fifth gas flow passage groove 92 communicates with an outlet hole 38a.

The fuel gas flow passage 82 is designed such that the number of grooves is decreased generally half by half in a stepwise manner from the inlet hole 36a to the outlet hole 38a. However, the number of grooves cannot be decreased to a half at the terminals of the third gas flow passage grooves 88a to 88c having the odd number of grooves. Accordingly, the fourth gas flow passage grooves 90, 90b are provided to have the number of a half of a number of grooves (four) obtained by adding 1 to the number of grooves 3 of the third gas flow passage grooves 88a to 88c, i.e., to have the number of two.

In the second and third embodiments constructed as described above, the desired gas utilization factor can be established respectively by decreasing the number of grooves for the respective fuel gas flow passages 62, 82 from the inlet hole 36a for introducing the gas to the outlet hole 38a for discharging the gas. Accordingly, the same effect as that obtained in the first embodiment is obtained, for example, in that the number of reactive molecules per unit area can be maintained in the surfaces 60a, 80a of the first separators 60, 80 to cause the reaction to be uniform, and it is possible to improve the drainage performance and the gas diffusion performance.

In the embodiments described above, the groove width and the ridge width of the first separators 14, 60, 80 are set to be about 1 mm by means of, for example, a cutting processing. However, they may be set to have a dimension of not more than 1 mm. The number of grooves is easily changed and set depending on various factors such as the area of the separator. It is possible to use various combinations including, for example, eight individual grooves on the inlet side and two individual grooves on the outlet side, and twenty individual grooves on the inlet side and one individual groove on the outlet side. When the separator has a large area, the number of grooves on the inlet side can be set to be not less than twenty. In order to improve the drainage performance, for example, the groove portions of the fuel gas flow passages 40, 62, 82, i.e., the portions to make contact with the reformed gas may be allowed to have a water-repelling property.

The fuel cell stack according to the present invention is provided with the first and second gas flow passages for supplying the fuel gas and the oxygen-containing gas to the first and second separators which hold the fuel cell unit therebetween. The first gas flow passage and/or the second gas flow passage is set to have the number of gas flow passage grooves on the gas inlet side, which is larger than the number of gas flow passage grooves on the gas outlet side. Therefore, when the gas is consumed in the surface of the first separator and/or the second separator, the number of reactive molecules per unit area is prevented from being decreased by decreasing the number of gas flow passage grooves, making it possible to cause the reaction to be uniform on the electrode surface. Further, it is possible to effectively increase the gas flow rate on the gas outlet side, and it is possible to easily improve the drainage and the gas diffusion performance.

What is claimed is:

1. A fuel cell stack comprising a fuel cell unit including an electrolyte interposed between an anode electrode and a cathode electrode, and first and second separators for holding said fuel cell unit therebetween, wherein:

said first and second separators have first and second gas flow passages for supplying a fuel gas and an oxygen-containing gas to said anode electrode and said cathode electrode respectively; and at least one of said first gas flow passage and said second gas flow passage is set to have a number of gas flow passage grooves on a gas inlet side, which number is larger than a number of gas flow passage grooves on a gas outlet side, in one surface of said first separator and said second separator, or both in said first and second separators.

2. The fuel cell stack according to claim 1, wherein said number of gas flow passages grooves on said gas inlet side and said number of gas flow passage grooves on said gas outlet side are set to conform to a decreasing rate corresponding to gas utilization factors of said fuel gas and said oxygen-containing gas.

3. The fuel cell stack according to claim 2, wherein the number of gas flow passage grooves in at least one of said first and second gas flow passages is set such that said number of gas flow passage grooves is decreased half by half in a stepwise manner from said gas inlet side to said gas outlet side, and when said number of gas flow passage grooves is an odd number, said number of gas flow passage grooves is decreased to a half of a number obtained by adding 1 to the odd number of gas flow passage grooves.

4. The fuel cell stack according to claim 1, wherein said gas flow passage grooves on said gas inlet side are continuously merged to said gas flow passage grooves on said gas outlet side.

5. The fuel cell stack according to claim 1, wherein said gas flow passage grooves are of a serpentine configuration.

6. The fuel cell stack according to claim 1, wherein said gas flow passages on said gas inlet side are disposed at the upper portion and said gas flow passages on said gas outlet side are disposed at the lower portion, and wherein said gas flow passages on said gas inlet side are of a serpentine configuration in the direction of gravity to said gas flow passages on said gas outlet side.

7. The fuel cell stack according to claim 1, wherein said gas inlet is disposed at the upper portion of said separators and said gas outlet side is disposed at the lower portion of said separators, and wherein said gas flow passage grooves extend horizontally from side-to-side of said separators and downwardly near each side for connecting said horizontal grooves.

8. A fuel cell stack comprising a fuel cell unit including an electrolyte interposed between an anode electrode and a cathode electrode, and first and second separators for holding said fuel cell unit therebetween, wherein:

said first and second separators have first and second gas flow passages for supplying a fuel gas and an oxygen-containing gas to said anode electrode and said cathode electrode respectively;

each of said first and second gas flow passages is set to have a number of gas flow passage grooves on a gas inlet side, which number is larger than a number of gas flow passage grooves on a gas outlet side, in a surface of each of said first and second separators; and at least one of said first gas flow passage and said second gas flow passage being formed such that said gas flow passage grooves on said gas inlet side are merged to said gas flow passage grooves on said gas outlet side.

9. The fuel cell stack according to claim 8, wherein said number of gas flow passage grooves on said gas inlet side and said number of gas flow passage grooves on said gas outlet side are set to conform to a decreasing rate corresponding to gas utilization factors of said fuel gas and said oxygen-containing gas.

10. The fuel cell stack according to claim 9, wherein each of said first and second gas flow passages is set such that said number of gas flow passage grooves is decreased half by half in a stepwise manner from said gas inlet side to said gas outlet side, and when said number of gas flow passage grooves is an odd number, said number of gas flow passage grooves is decreased to a half of a number obtained by adding 1 to the odd number of gas flow passage grooves.

11. The fuel cell stack according to claim 8, wherein said gas flow passage grooves are of a serpentine configuration.

12. The fuel cell stack according to claim 8, wherein said gas flow passages on said gas inlet side are disposed at the upper portion and said gas flow passages on said gas outlet side are disposed at the lower portion, and wherein said gas flow passages on said gas inlet side are of a serpentine configuration in the direction of gravity to said gas flow passages on said gas outlet side.

13. A fuel cell stack having a fuel cell unit including an electrolyte interposed between an anode electrode and a cathode electrode, and first and second separators for holding said fuel cell unit therebetween, improvement comprising:

at least one of said separators having a gas flow passage comprised of a number of gas flow passage grooves on a surface facing the electrode, the number of gas flow passage grooves decreasing from a gas inlet to the gas flow passage to a gas outlet from the gas flow passage.

14. The fuel cell stack according to claim 13, wherein said number of gas flow passage grooves from said gas inlet and said number of gas flow passage grooves to said gas outlet are set to conform to a decreasing rate corresponding to gas utilization factors of the fuel cell stack.

15. The fuel cell stack according to claim 13, wherein said gas flow passage grooves of said gas flow passage is set such that said number of gas flow passage grooves is decreased substantially half by half in a stepwise manner from said gas inlet to said gas outlet side.

16. The fuel cell stack according to claim 13, wherein pairs of said gas flow passage grooves merge in a stepwise manner from said gas inlet to said gas outlet.

17. The fuel cell stack according to claim 13, wherein each of said gas flow passage grooves is of substantially the same depth and width.

* * * * *